(12) United States Patent
Askof et al.

(10) Patent No.: US 10,876,567 B2
(45) Date of Patent: Dec. 29, 2020

(54) WALL ANCHOR

(71) Applicant: Keter Plastic Ltd., Herzliya (IL)

(72) Inventors: Avraham Askof, Kokhav Ya'ir Tzur Yigal (IL); Yigal Steiner, Megiddo (IL)

(73) Assignee: Keter Plastic Ltd., Herzliya (IL)

( * ) Notice: Subject to any disclaimer, the term of this patent is extended or adjusted under 35 U.S.C. 154(b) by 433 days.

(21) Appl. No.: 15/694,082

(22) Filed: Sep. 1, 2017

(65) Prior Publication Data

US 2018/0058492 A1   Mar. 1, 2018

(30) Foreign Application Priority Data

Sep. 1, 2016  (IL) .......................................... 247594
Jul. 11, 2017  (IL) .......................................... 253430

(51) Int. Cl.
*F16B 21/00* (2006.01)
*F16B 37/04* (2006.01)

(52) U.S. Cl.
CPC .......... *F16B 37/041* (2013.01); *F16B 37/044* (2013.01)

(58) Field of Classification Search
USPC ......................................... 411/340, 174, 175
See application file for complete search history.

(56) References Cited

U.S. PATENT DOCUMENTS

| | | | |
|---|---|---|---|
| 2,180,266 A | 11/1939 | Tinnerman | |
| 2,196,711 A | 4/1940 | Tinnerman | |
| 2,258,845 A | 10/1941 | Burke | |
| 2,315,359 A | 3/1943 | Tinnerman | |
| 2,400,270 A * | 5/1946 | Tinnerman | F16B 37/041 411/103 |
| 2,562,001 A | 7/1951 | Tinnerman | |
| 2,562,002 A | 7/1951 | Tinnerman | |
| 2,566,886 A | 9/1951 | Hartman | |
| 2,672,905 A * | 3/1954 | Hartman | F16B 37/041 411/175 |
| 2,676,635 A * | 4/1954 | Tinnerman | F16B 37/041 411/173 |
| 2,836,216 A | 5/1958 | Rapata | |
| 3,145,753 A * | 8/1964 | Kreider | F16B 37/041 411/112 |
| 3,229,743 A | 1/1966 | Derby | |
| 3,426,818 A | 2/1969 | Derby | |
| 3,927,707 A | 12/1975 | Wright | |
| 4,074,491 A * | 2/1978 | Bell | B64C 1/06 52/394 |

(Continued)

FOREIGN PATENT DOCUMENTS

DE   197 21 757 C1   7/1998
EP   0 010 833 A1   5/1980

(Continued)

*Primary Examiner* — Gary W Estremsky
(74) *Attorney, Agent, or Firm* — Vorys, Sater, Seymour and Pease LLP; William L. Klima

(57) ABSTRACT

Provided are wall anchors including an external plate and an inside plate partially overlapping the external plate, each of the external plate and an inside plate having a wall-facing side, the plates being rigidly connected to one another adjacent a first end of their respective wall-facing sides by a cylindrical connecting member; at least a portion of the cylindrical connecting member is configured with a round perimeter. Further provided are modifications of such wall anchors.

18 Claims, 11 Drawing Sheets

(56) References Cited

U.S. PATENT DOCUMENTS

| | | | |
|---|---|---|---|
| 4,219,064 A | 8/1980 | Lozano | |
| 4,243,086 A | 1/1981 | Kuttler et al. | |
| 4,270,591 A | 6/1981 | Gill et al. | |
| 4,286,642 A * | 9/1981 | Keatley | F16F 1/36 29/453 |
| 4,396,326 A | 8/1983 | McKinnie, III et al. | |
| 4,674,931 A | 6/1987 | Schwind et al. | |
| 4,729,706 A * | 3/1988 | Peterson | F16B 37/041 411/112 |
| 4,798,507 A | 1/1989 | Olah | |
| 4,826,375 A | 5/1989 | Holton | |
| 5,039,264 A * | 8/1991 | Benn | F16B 37/041 411/112 |
| 5,059,074 A | 10/1991 | Guevarra et al. | |
| 5,339,500 A * | 8/1994 | Muller | F16B 37/041 24/514 |
| 5,423,646 A | 6/1995 | Gagnon | |
| 5,713,707 A * | 2/1998 | Gagnon | F16B 37/041 411/112 |
| 5,890,858 A * | 4/1999 | Leroux | F16B 37/041 411/175 |
| 5,961,264 A | 10/1999 | Postadan | |
| 6,006,414 A * | 12/1999 | Corporon | F16B 37/041 29/525.02 |
| 6,287,064 B1 * | 9/2001 | Jhumra | F16B 37/043 411/112 |
| 6,679,664 B2 | 1/2004 | Ikuta | |
| 7,527,464 B2 | 5/2009 | Stewart et al. | |
| 9,885,376 B1 * | 2/2018 | Meyer | F16B 7/18 |
| 10,180,157 B1 * | 1/2019 | Glickstein | A63B 17/00 |
| 2004/0096290 A1 | 5/2004 | Birnbaum | |
| 2004/0202523 A1 | 10/2004 | Csik | |
| 2005/0129481 A1 | 6/2005 | Wimmer et al. | |
| 2005/0220563 A1 | 10/2005 | Kosidlo, IV et al. | |
| 2006/0072981 A1 | 4/2006 | Bros et al. | |
| 2008/0092458 A1 | 4/2008 | Payne | |
| 2009/0311071 A1 | 12/2009 | Allen et al. | |
| 2010/0050416 A1 | 3/2010 | Renke et al. | |
| 2014/0345091 A1 | 11/2014 | Pierce et al. | |
| 2015/0047171 A1 | 2/2015 | Hoffman et al. | |

FOREIGN PATENT DOCUMENTS

| | | |
|---|---|---|
| EP | 0 407 282 A1 | 1/1991 |
| FR | 2 679 302 A1 | 1/1993 |
| GB | 527340 A | 10/1940 |
| GB | 659926 A | 10/1951 |
| IT | 1074811 B | 4/1985 |
| JP | 53-85260 A | 7/1978 |
| JP | 10-306818 A | 11/1998 |
| JP | 2004-100411 A | 4/2004 |
| KR | 1998-016369 U | 6/1998 |
| KR | 1998-038596 U | 9/1998 |
| KR | 10-0187149 B1 | 5/1999 |
| WO | 01/98033 A2 | 12/2001 |
| WO | 2004/092596 A1 | 10/2004 |
| WO | 2006/072337 A1 | 7/2006 |
| WO | 2008/157265 A1 | 12/2008 |

* cited by examiner

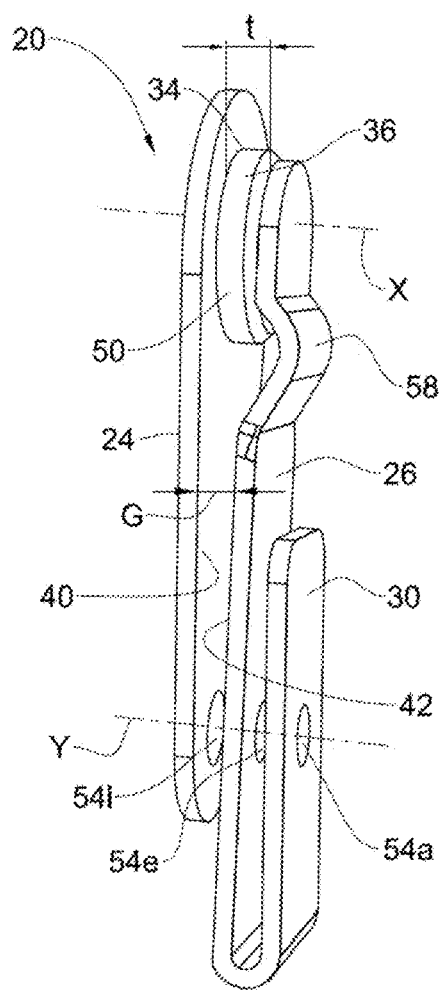
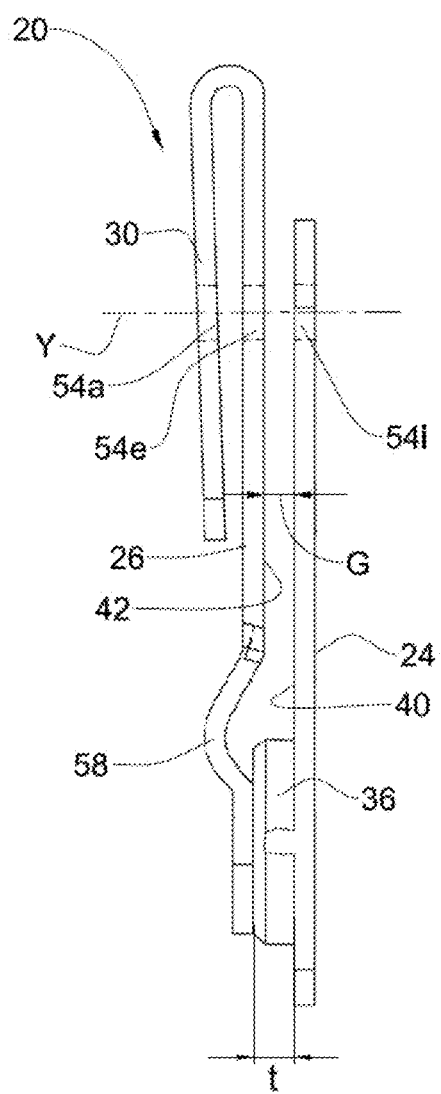
Fig. 1C
Fig. 1D

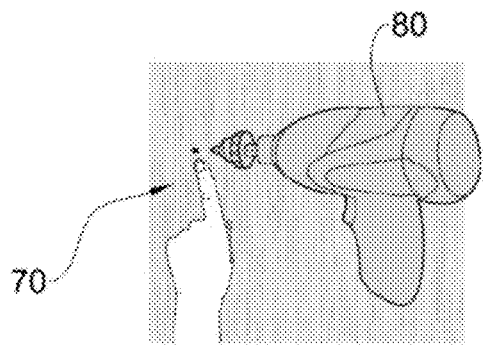 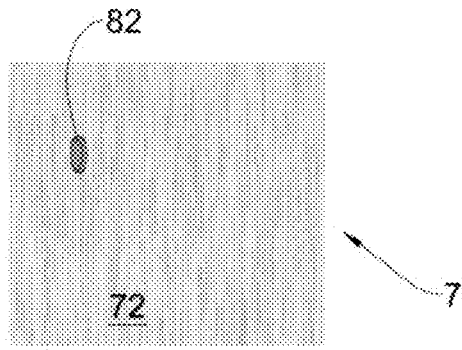
Fig. 3A　　　　　　Fig. 3B
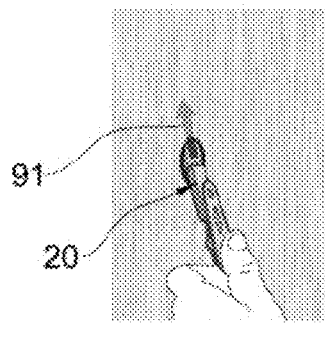 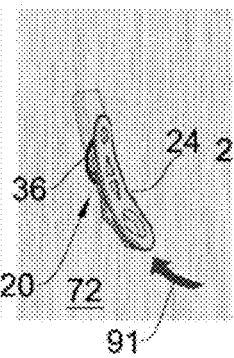 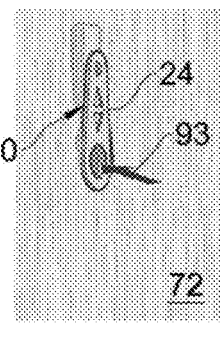
Fig. 3C　　Fig. 3D　　Fig. 3E
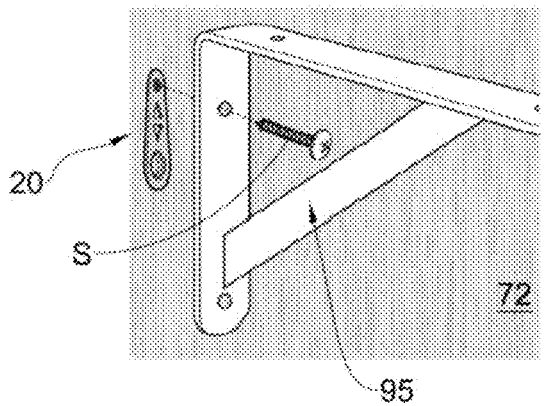
Fig. 3F

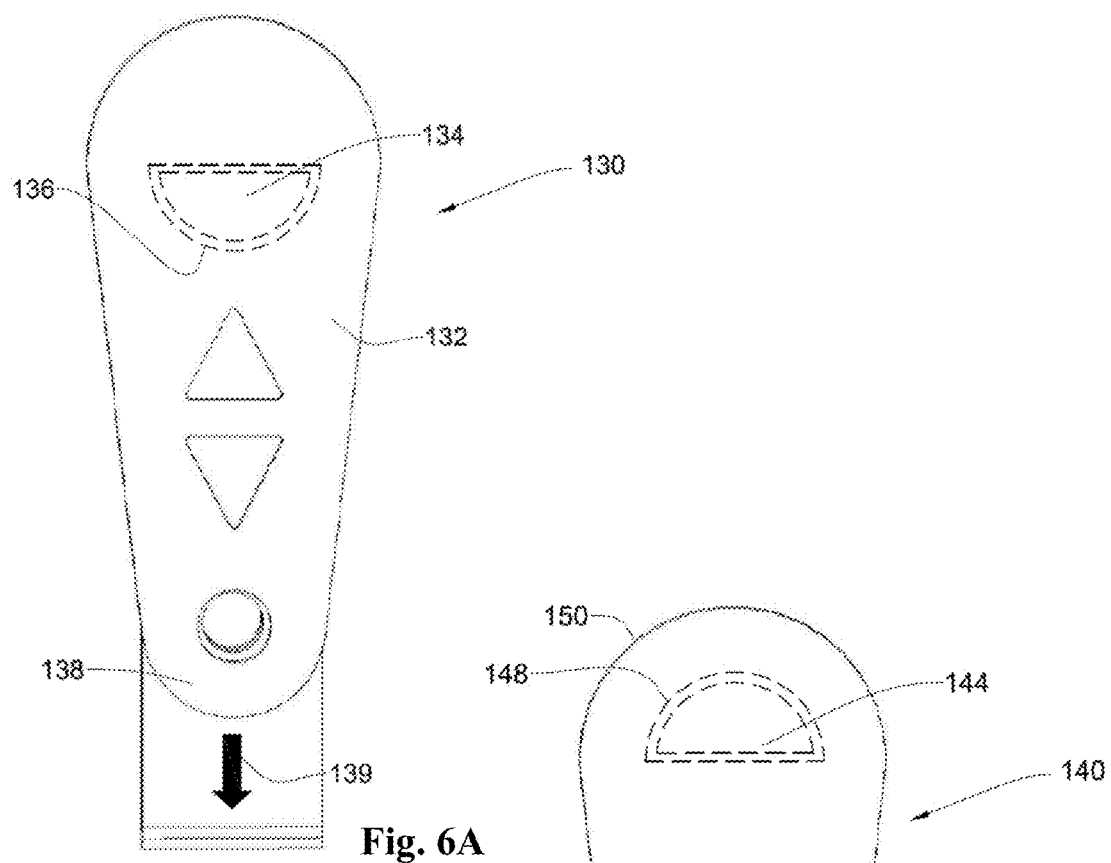
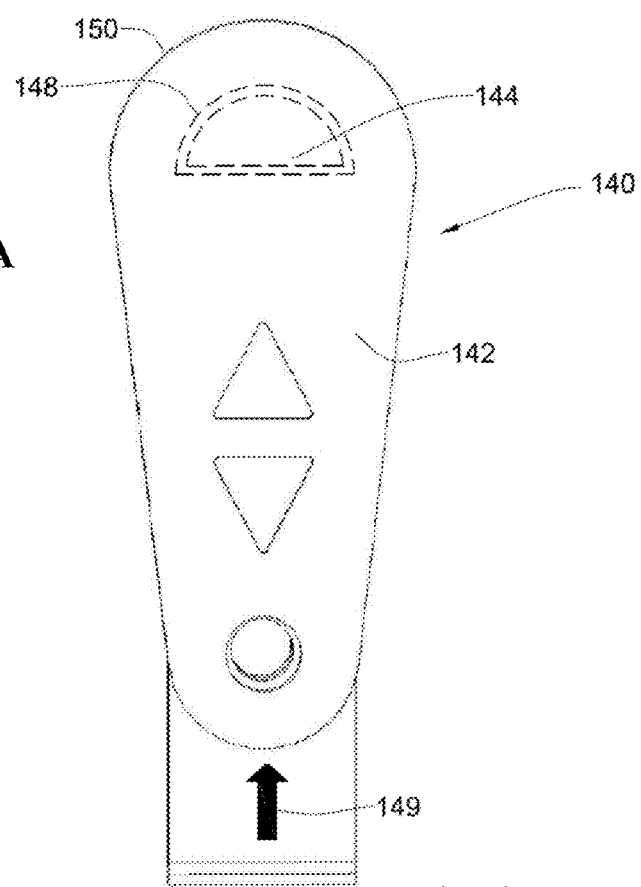
Fig. 6A
Fig. 6B

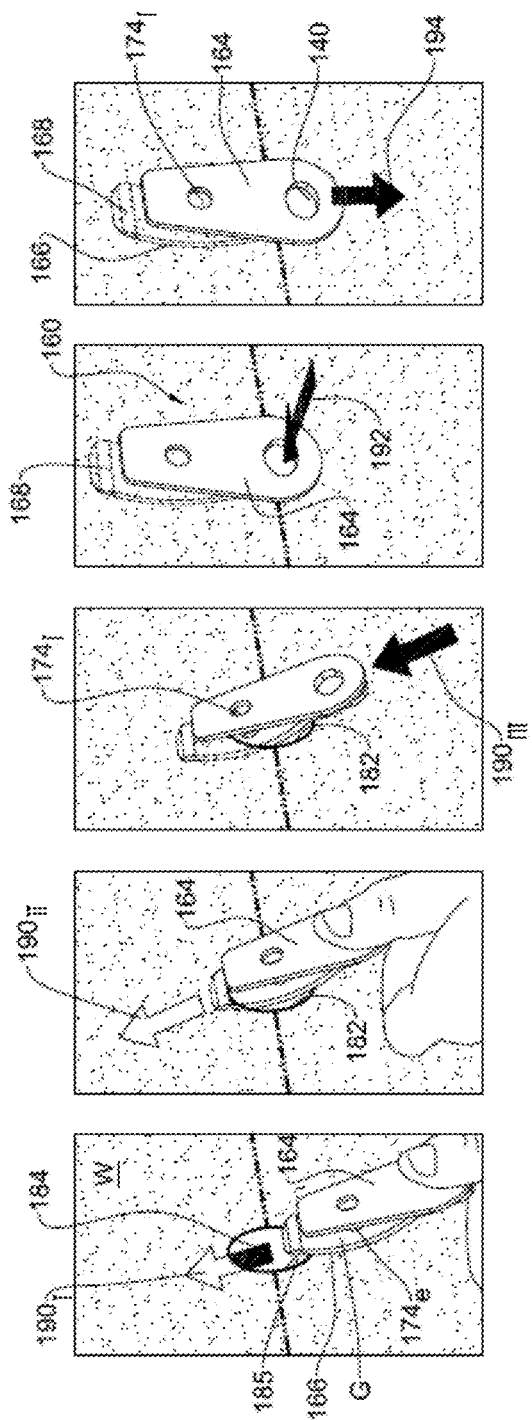

WALL ANCHOR

TECHNOLOGICAL FIELD

The device disclosed herein relates to wall anchors and more specifically to clip-nuts commonly used for mounting fasteners on thin or weak walls, applied anywhere on the wall's surface or its edges.

BACKGROUND ART

References considered to be relevant as background to the presently disclosed subject matter are listed below:
U.S. Pat. No. 3,927,707
U.S. Pat. No. 5,039,264
Acknowledgement of the above references herein is not to be inferred as meaning that these are in any way relevant to the patentability of the presently disclosed subject matter.

BACKGROUND

Mounting an item on a wall portion, can be facilitated using different fasteners such as a screw, a rivet or a nail, though commonly used, often requires the application of screw anchors, i.e. fastening nuts, for securing the fastener and for reducing the contact forces developing on the wall by enlarging the contact surface area, thus preventing the wall from being effected (e.g. cracked or distorted) by the weight of the load.

In thin walls, where even relatively small contact forces can cause distortion of a wall's surface, screw anchors so called clip-nuts (at times referred to also as J-nuts) are often used, in order to enlarge the contact area which improves the wall's portion's resilience to shear.

Clip-nuts also provide a solution for mounting of items on walls which are accessible from one side only, as these can be mounted on the edge of a wall or on a blind bore or shank on a wall's surface.

U.S. Pat. No. 3,927,707 discloses a clip nut for use at a corner of a plate or work panel where a hole is near the corner. The clip nut has a threaded nut element and two bent arms extending at an angle to receive and grip the work panel around its converging edges. The arms have a back portion which serves to mate with the converging edges of the panel that meet at the corner and thereby to locate the nut element with respect to the hole. Dimples on the arms cause resilient stress on the arms when assembled to a panel to hold the clip nut in place.

U.S. Pat. No. 5,039,264 discloses a clip-on nut for enabling a panel to be secured to a support structure, the clip-on nut being secured to the support structure. The clip-on nut has a portion for guiding the clip-on nut into an aperture formed on the support structure, the guide portion comprising a spherically rounded projection. The clip on-nut comprises a U-shaped metal member having first and second leg members extending laterally from a curved end portion, apertures being formed in each of said first and second leg members, said apertures being in alignment.

GENERAL DESCRIPTION

The present disclosure concerns a clip-nut type wall anchor which may be adapted for mounting items anywhere on a wall's surface, including near an edge of the wall. Thus, the present disclosure provides a wall anchor adapted to be mounted to a support wall via an opening formed therein and to support a fastener thereon.

In a first aspect, there is provided a wall anchor comprising an external plate and an inside plate partially overlapping the external plate, each of the external plate and an inside plate having a wall-facing side, the plates being rigidly connected to one another adjacent a first end of their respective wall-facing sides by a cylindrical connecting member; at least a portion of the cylindrical connecting member is configured with a round perimeter.

The term inside plate as used herein denotes a plate member of the wall anchor which in use remains visible and through which a fastener is inserted, whilst the term external plate denotes a plate member of the wall anchor which in use extends behind a wall surface and is not visible, this being irrespective if the wall surface is internal or external of a structure.

According to one arrangement, the wall anchor is configured such that in use the first end extends substantially above a second end of the external plate and the inside plate, wherein at least a portion of cylindrical connecting member facing the first end or the second end, is rounded.

According to another arrangement, the wall anchor is configured such that in use the first end extending substantially below a second end of the external plate and the inside plate.

The inside plate is configured for disposing flush over a wall surface and an axis of the cylindrical connecting member extends normal from the wall-facing side of the inside plate.

In another aspect, the present disclosure provides a wall anchor comprising an inside plate and an outside plate, being spaced apart and generally parallely disposed one to the other, and connected to one another at a first end of the wall anchor by a cylindrical connecting member extending normal to a plane of said inside plate and outside plate, said connecting member having a round portion facing at least the first end or a second end of the wall anchor.

A further aspect provides a wall anchor for securing a fastener to a wall, the wall anchor comprising an inside plate and an outside plate attached to one another at a first end of the wall anchor by a cylindrical connecting member, the cylindrical connecting member retaining the inside plate and the outside plate at a spaced apart relation with a wall-receiving gap extending there between, wherein at a mounted position a wall portion is received in said wall-receiving gap and extending flush between an inside face of the inside plate and an inside face of the outside plate, and at least a portion of the connecting member bears against walls of an opening formed in the wall.

Each of the arrangements of the wall anchor disclosed herein is configured for inserting the external plate member into an opening formed in the wall and then positioned such that a wall portion extends between the inside faces of the external and inside plates, wherein at least the inside plate bears flush against an inside face of the wall portion, and wherein at least a round portion of the cylindrical connecting member bearing against at least a portion of the opening. Thus, the wall anchor is suitable for use where access to an outside wall surface is limited or not possible, e.g. as in the case of a blind opening formed for example in a double-wall plastic molded panel, and the like.

According to one particular configuration, the outside plate of the wall anchor is concave. In particular, this configuration can be facilitated where the wall anchor is not configured with an auxiliary fastening plate, as described further below.

Any one or more of the following features, designs and configurations can be applied in a wall anchor according to the present disclosure, separately or in various combinations thereof:

Each of the external plate and an inside plate may be a-priori configured with at least one coaxially extending fastener-receiving bore;

One or both of the external plate and an inside plate may be flexible (i.e. elastically deformable) or comprise a flexible portion. Flexibility facilitates mounting the wall anchor on a wall;

The external plate may extend parallel to the inside plate;

The external plate may be configured with at least one auxiliary fastening plate. The at least one auxiliary fastening plate may be integral with or be attached to the external plate;

The at least one auxiliary fastening plate may extend parallel to the external plate;

The external plate may be U-shaped, with the auxiliary fastening plate extending from a second end of the external plate and facing the first end;

The cylindrical member may be round. The diameter of the cylindrical member may be similar to or slightly less than a nominal diameter of a mounting opening formed in the wall;

The wall anchor may be made of metal, plastic or any other suitable material, imparting the wall anchor sufficient rigidity for clamping a screw through the coaxially extending fastener receiving bores, however facilitating bending the wall anchor for manipulating it into the wall's opening;

The inside plate may comprise a concealing portion extending beyond boundaries of the cylindrical member and concealing same;

The wall anchor may be mounted with the second end facing at any angular orientation. According to one particular example the wall anchor may be mounted with the second end disposed below the first end. According to another particular example the wall anchor may be mounted with the second end disposed above the first end;

The cylindrical member may have a thickness corresponding to the thickness of a wall onto which the wall anchor is to be mounted.

The distance of the inside plate and the external plate, at the first end thereof, may be defined by the thickness of the cylindrical member, said thickness being measured along an axis extending normal to the wall-facing side of the inside plate;

The circumcircle of the connecting member may have a diameter corresponding to an opening formed in a wall through which the external plate is introduced;

The distance between the wall-facing sides of the inside plate and of the external plate corresponds with a nominal thickness of a wall configured to bear the wall anchor;

The circumcircle of the connecting member corresponds with a nominal diameter of a round opening in the wall configured to bear the wall anchor;

The wall anchor may be used as clip-nut for mounting at an edge of a thin wall portion, wherein the cylindrical connecting member extends outside of said wall portion;

At least a portion of the cylindrical connection member may be configured for bearing against a circular portion of an opening formed in the wall;

The width of the external plate may be at most the diameter of the connecting member;

The external plate may extend from a rear of the connecting member and is bent towards the inside plate so as to reduce the gap between the plates at least a second end portion thereof, i.e. remote from the connecting member;

The external plate may be longer than the inside plate, wherein the second end portion of the external plate, can extend beyond the second end of the inside plate, thus improving load bearing;

The outside plate of the wall anchor may be concave, and wherein a free end of the outside plate, i.e. an end remote from the first end, can be configured with an outwards bent tip, i.e. facing away from the inside plate;

The diameter of the fastener receiving bore extending at the inside plate can be larger than the nominal diameter of the fastener receiving bore extending at the outside plate;

The outside plate of the wall anchor may be concave, and the gap between the inside plate and the external plate may be smaller adjacent connecting member;

The outside plate of the wall anchor may be single layered.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1C is a side rear perspective view of the wall anchor of FIG. 1A;

FIG. 1D is a side view of the wall anchor of FIG. 1A;

FIGS. 3A to 3F are schematic representations illustrating consecutive steps of applying a wall anchor according to the disclosure on a wall portion.

FIGS. 6A and 6B are planar front (inside) views of wall anchors according to another embodiment of the present disclosure.

FIGS. 8A to 8E are schematic representations illustrating consecutive steps of applying wall anchor according to the embodiment of FIGS. 7A-7F, on a wall portion.

DETAILED DESCRIPTION OF EMBODIMENTS

Figure 1A:
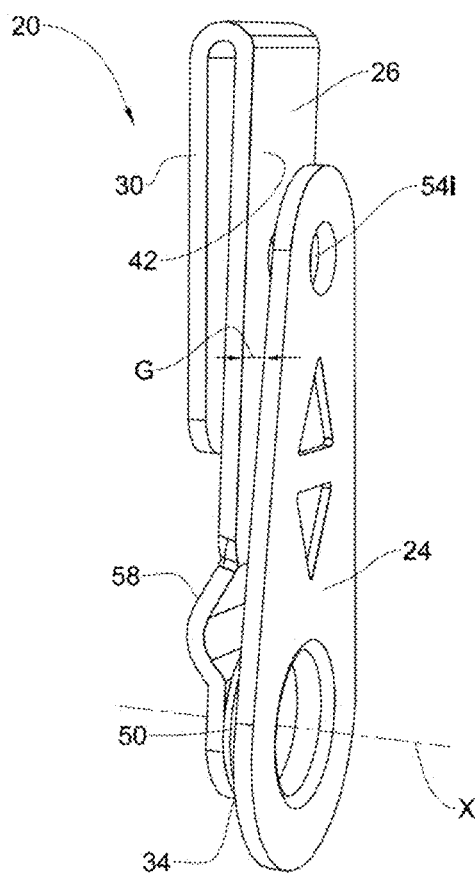
FIG. 1A is a front perspective view of a wall anchor according to an embodiment of the present disclosure.
Figure 1B:
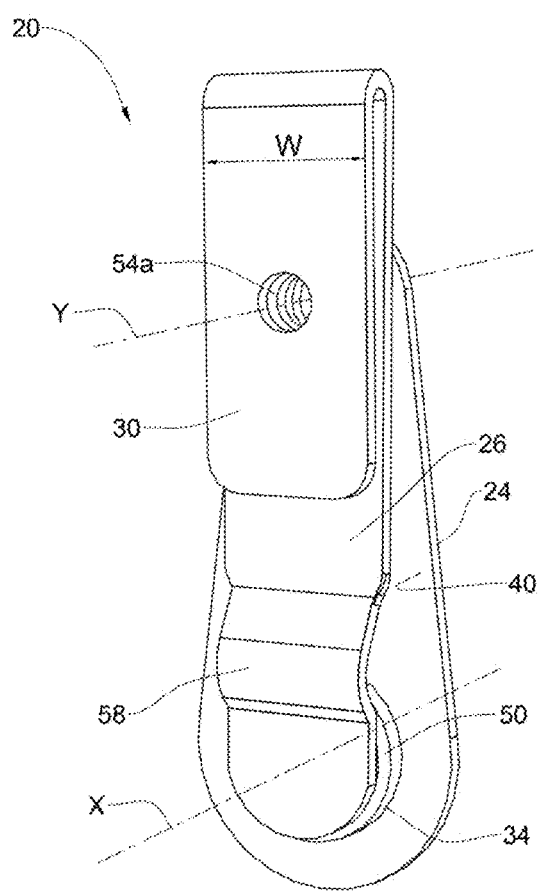
FIG. 1B is a rear perspective view of the wall anchor of FIG. 1A.

Attention is first directed to FIGS. 1A to 1E of the drawings illustration a wall anchor according to an example of the present disclosure, generally designated 20. The wall anchor is made of rigid though somewhat pliable/flexible material, e.g. metal sheet, composite material, reinforced sheet material, etc.

Wall anchor 20 illustrated in FIGS. 1 to 4 is configured with an inside plate 24 and an external plate 26, with an auxiliary fastening plate 30 integrally extending from said external plate 26, imparting it a U-shape. In the illustrated example it is seen that the inside plate 24, the external plate 26 and the auxiliary fastening plate 30 are disposed substantially parallel to one another and that the plates are substantially of equal sheet thickness.

It is noted throughout the Figures that the external plate 26 is longer than the inside plate 24, i.e. an opposite end (second end portion) of the external plate 26 extends beyond the respective end of the inside plate. This arrangement strengthens the external plate 26 improving its load/shear resistance. However it is of note that the external plate and the inside plate may have substantially equal lengths.

As can further be seen, the inside plate 24 is attached to the external plate 26 at a first end portion 34 via a cylindrical connecting member 36 having an axis X extending substantially normal to the respective planes of the inside plate 24 and external plate 26, said connecting member 36 being a round cylinder having an external diameter d (best seen in FIG. 1E) and a thickness t (best seen in FIG. 1D), said thickness retaining the plates at a spaced-apart relation and defining a wall-receiving gap G between an inside face 40 of the inside plate 24 and an inside face 42 of the external plate 26. In the illustrated example, the surface of both the inside face 40 and inside face 42 are flat and smooth and are configured for receiving therebetween respective inside face 72 and outside face 74 of a wall 70, as will be discussed hereinafter with reference to FIGS. 3A-3F.

Figure 2A:
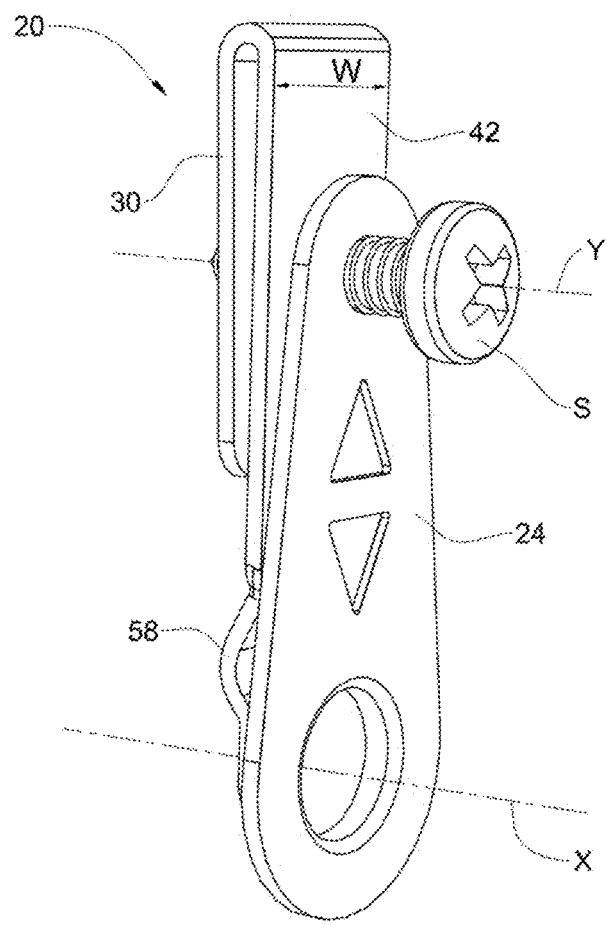
FIGS. 2A and 2B are perspective front and rear views, respectively, of the wall anchor of FIGS. 1A-1E, fitted with a fastener.
Figure 2B:
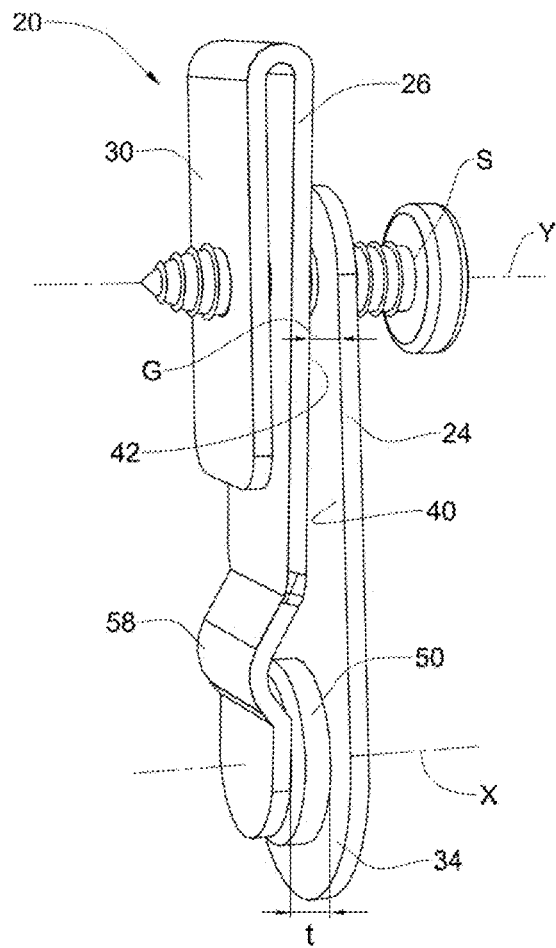

It is further noted that the cylindrical connecting member 36 has a round perimeter wall surface 50 and further that the three parallely disposed plate members, namely the inside plate 24, the external plate 26 and the auxiliary fastening plate 30 are each configured with an a-priori fastener receiving bore $54_i$, $54_e$ and $54_a$, respectively, coaxially extending along axis Y, disposed substantially parallel to axis X. The fastener receiving bores $54_i$, $54_e$ and $54_a$ can be threaded or smooth, and can be of a diameter smaller than the nominal diameter of a threaded fastener configured for screw engagement therewith, e.g. screw/bolt S (FIGS. 2A and 2B). It is appreciated that while in the present example there bores $54_i$, $54_e$ and $54_a$ are co-axial, in accordance with other examples (not illustrated) bores $54_i$, $54_e$ and $54_a$ may be located elsewhere or may not be co-axial.

Also seen, the external plate 26 is attached to the cylindrical connecting member 36 at the first end portion 34 of the wall anchor 20 and is then configured with a bent portion 58 configured for narrowing the gap G such that it corresponds approximately to the thickness of the cylindrical connecting member 36, i.e. wherein G≈t.

Figure 1E:
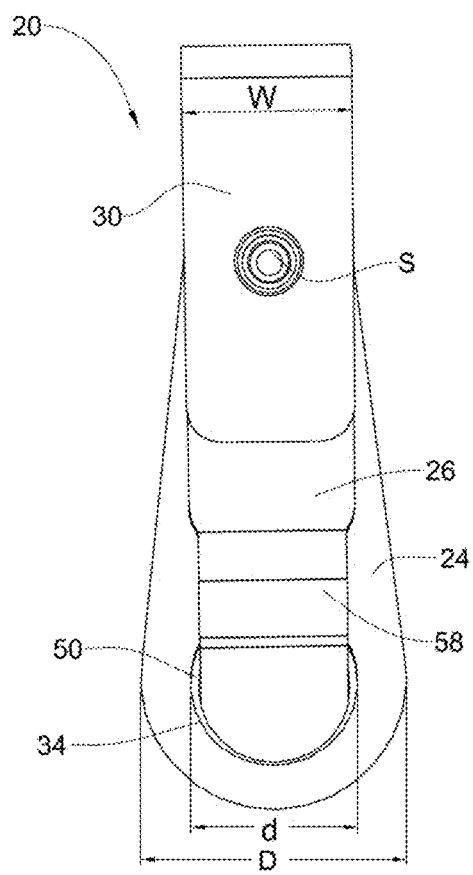
FIG. 1E is a back view of the wall anchor of FIG. 1A.

As can best be seen in FIG. 1E, the width D of the inside plate 24 at least at the location of the connecting member 36 is greater than the diameter d of the connecting member 36 (D>d), whereby when viewed from the inside plate 24 said connecting member is not seen, and further wherein a receiving opening formed in the wall portion 70 (to be discussed hereinafter), is concealed.

In addition, it is seen that the external plate 26 and the auxiliary fastening plate 30 both have a width W which is equal or smaller than the diameter d of the connecting member 36, namely W≤d.

In the illustrated example of FIGS. 1 and 2 it is seen that the cylindrical connecting member 36 is formed integrally with the inside plate 24 by pressing it outwards, and the external plate 26 is attached to the connecting member 36 e.g. by welding, with the auxiliary fastening plate 30 extending integral and in continuation with the external plate 26. However, other forms of manufacturing can be utilized, e.g. molding, 3D printing, other forms of assembly, etc., all of which do not depart from the scope of the disclosure.

With further reference now being made to sequential FIGS. 3A to 3F, a step-by-step illustration is provided for demonstrating mounting of a wall anchor according to the present disclosure generally designated 20 on a wall portion generally designated 70.

At first, when considering where to fit the wall anchor, one has to confirm that there are no obstacles behind the wall surface, e.g. hidden mullion, support ribs and the like. Once location is determined an opening is drilled in the wall 70, using a hand tool, i.e. drill 80 (FIG. 3A). The diameter of the opening 82 formed at the wall (FIG. 3B) is a nominal diameter similar to the diameter d of the cylindrical connecting member 36 of the wall anchor 70, and the thickness of the wall portion at the drilling site is approximately similar to the wall-receiving gap G (between an inside face 40 of the inside plate 24 and an inside face 42 of the external plate 26).

Then, the wall anchor 20 is manipulated into the opening 82 by slightly elastically bending the wall anchor 20 to introduce the second end (the bent end) of external plate 26 and the auxiliary fastening plate 30 into the opening 82 (in direction of arrows 91 FIGS. 3C and 3D), and then slightly pushing the inside plate 24 at the location of the connecting member 36 against the wall surface 72 (as indicated by arrow 93 FIG. 3E), so that the connecting member 36 fits within the round opening 82 such that at least portions of perimeter wall surface 50 of the connecting member 36 bear against respective walls of the opening 82. According to the illustrated configuration, where the cylindrical connecting member 36 conforms with the nominal diameter of opening 82, the fitting at the assembled position is almost press-fit with sung bearing of perimeter wall surface 50 over wall surface of the opening/bore 82.

It is seen that the wider portion 34 at the first end of inside plate 24 has a width W well concealing the boundaries of the bore 82.

Once positioned in place, the wall anchor 20 is ready for applying a fastener S thereto, e.g. for mounting a shelf support 95 (FIG. 3F). In this example, the threads of the fastener penetrate through four layers of material, namely receiving bore 54; of the inside plate 24, the wall portion 70, receiving bore $54_e$ of the external plate 26 and receiving bore $54_a$ of the auxiliary fastening plate 30, thus configured for bearing shear forces. In addition to loads transferred by the fastener, loads are also transferred by the round perimeter wall surface 50 and born by the shoulders of the opening 82 formed in the wall portion 70, thus assisting in load distribution and bearing capacity of the wall anchor 20.

Figure 4A:
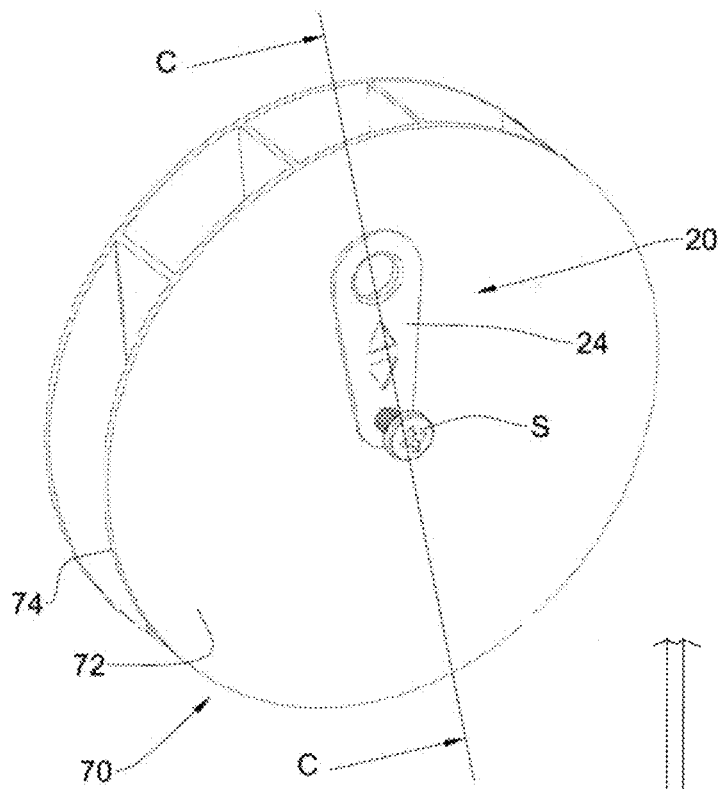
FIG. 4A is a perspective view of a wall anchor according to the disclosure mounted on a wall portion.
Figure 4B:
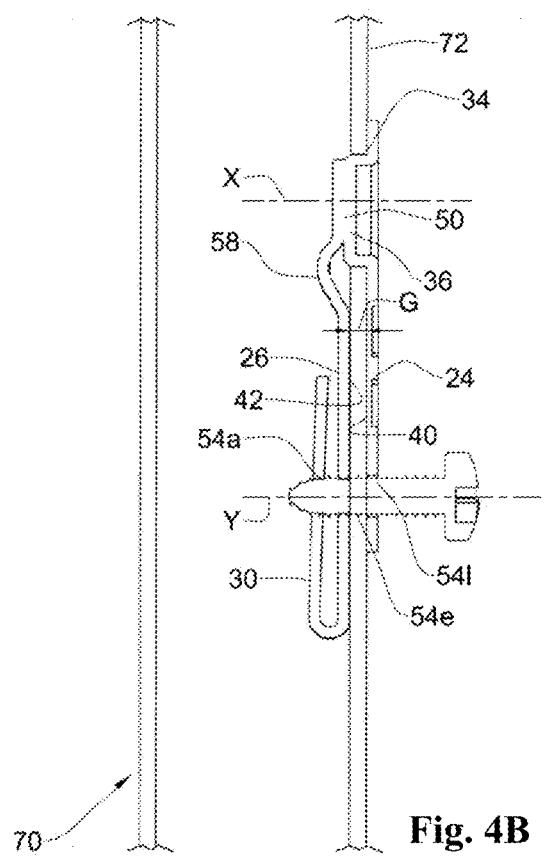
FIG. 4B is a longitudinal section along line C-C in FIG. 4A.

In FIGS. 4A and 4B the wall anchor is illustrated at larger scale after mounting on the wall portion, and as can be seen in the section of FIG. 4B the wall-receiving gap G is occupied by a wall portion 70, with inside face 40 of the inside plate 24 extending flush over the inside face 72 of the wall portion 70, and outside face 42 of the external plate 26 extending flush over the corresponding outside face 74 of the wall portion 70.

It is appreciated that the mounting of the wall anchor on the wall portion and applying the fastener thereto (for any purpose) require access only to the inside of the wall portion.

With further reference made now to FIGS. 5 and 6, there illustrated several additional examples of a wall anchor according to the present disclosure.

Figure 5A:
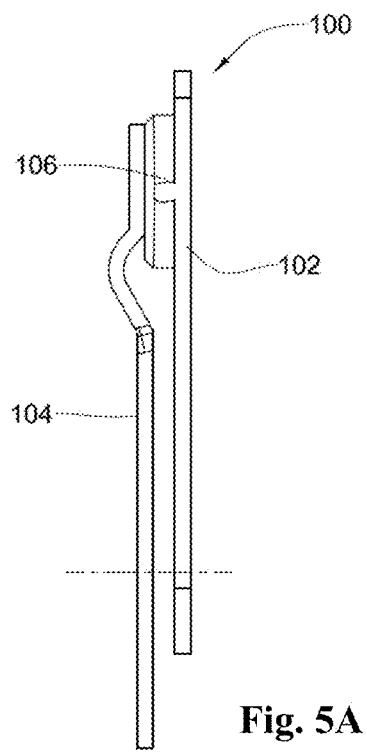
FIGS. 5A to 5C are side views of wall anchors according to another embodiment of the present disclosure.

FIG. 5A shows a wall anchor 100 that comprises an inside plate 102 and an external plate 104 connected to one another via a cylindrical connecting member 106 similar to the example of FIGS. 1 and 2, however in which external plate 104 is devoid of an auxiliary fastening plate.

Figure 5B:
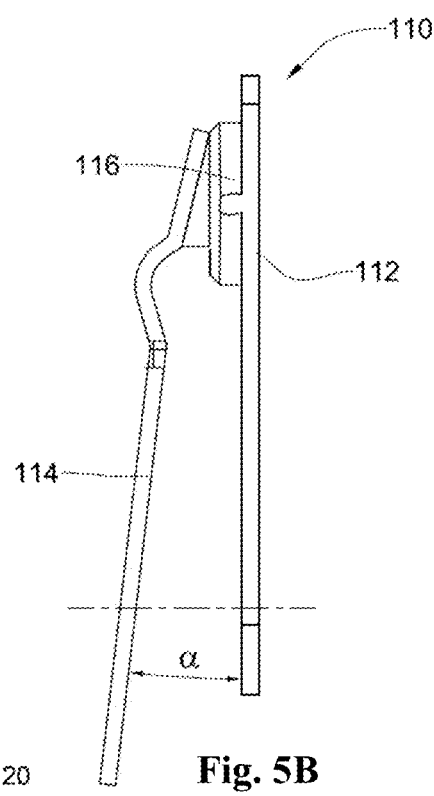

In FIG. 5B, the wall anchor 110 comprises an inside plate 112 and an external plate 114 connected to one another via a cylindrical connecting member 116 similar to the example of FIGS. 1 and 2, however with the external plate 104 (devoid of an auxiliary fastening plate) extending at an angle α with respect to the inside plate 112, whereby a fastener applied through the two plates causes the external plate 104 to elastically deform towards the external face of the respective wall portion (not shown), such that it is pre-stressed and will grip the fastener stronger, also with somewhat increased threaded surface area.

Figure 5C:
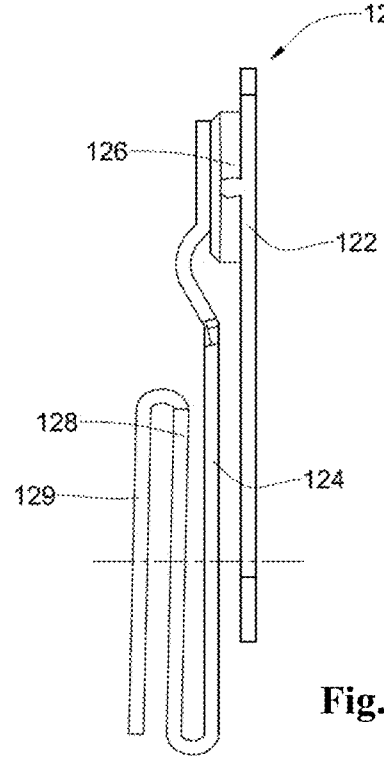

The wall anchor 120 of FIG. 5C comprises an inside plate 122 connected to an outside plate 124 through a cylindrical connecting member 126, with the external plate 124 being further configured with an S-shape and comprising two auxiliary fastening plates 128 and 129, thus providing increase sheer force to the wall anchor 120.

It is noted that in the three examples of FIGS. 5A to 5C, each of the inside plate, and the respective external plate and auxiliary plate is configured with an a-priori fastener receiving bores, as discussed in connection with the earlier example.

In FIG. 6A there is illustrated a front view of wall anchor 130 showing the inside plate 132 superimposed with the cylindrical connecting member 134 illustrated by dashed lines, the latter being semicircular so that only a bottom portion facing the second end 138 of the wall anchor is round. FIG. 6B illustrates a similar arrangement to that disclosed in FIG. 6A, where wall anchor 140 has an inside plate 142 and with the cylindrical connecting member 144 configured with a round portion only at a top portion, namely facing the first end 150 of the wall anchor. Wall anchors 130 and 140 of FIGS. 6A and 6B, respectively, are thus configured for bearing loads in opposite directions as illustrated by arrows 139 and 149 respectively.

Figure 7A:
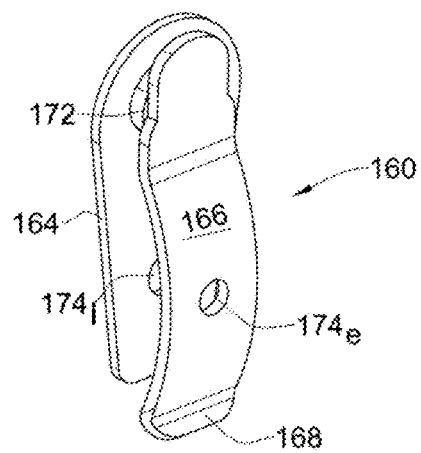
FIGS. 7A to 7E are perspective rear view, side view, perspective front view, rear view and front view, respectively, of a wall anchor according to another embodiment of the present disclosure.
Figure 7B:
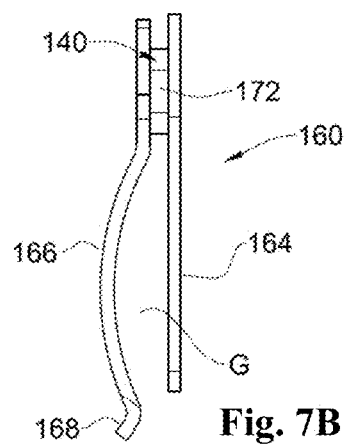
Figure 7C:
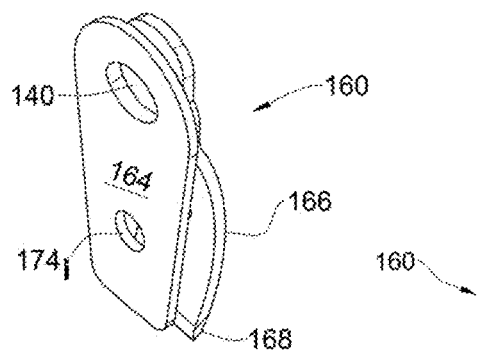
Figure 7D:
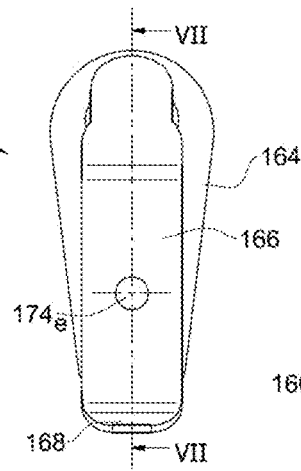
Figure 7E:
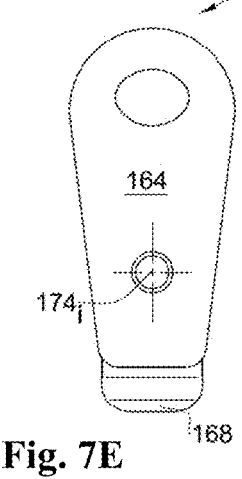

Further attention is now made to FIGS. 7A and 8E, directed to yet an example of a wall anchor of the disclosure, generally designated 160. The wall anchor 160 is configured with a flat inside plate 164 and a concaved, external plate 166, however being single layered, namely devoid of an auxiliary fastening plate.

The wall anchor 160 can be made of metal or plastic material, with the external plate 166 designed to deform upon fastening a bolt and tightening same as will be discussed with reverence to FIGS. 8A-8E.

Figure 7F:
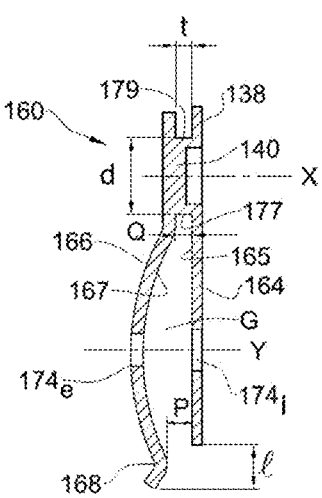
FIG. 7F is planar section along line VII-VII in FIG. 7D.

It is seen that the external plate 166 is slightly longer than the inside plate 164 (length difference identified in FIG. 7F as l), with a free tip 168 of the external plate 166 being outwardly bent, i.e. facing away from the inside plate 164.

Similar to the previous examples, the inside plate 164 is attached to the external plate 166 at a first end portion 138 via a cylindrical connecting member 140, having an external diameter d (FIG. 7F) and thickness t, said thickness retaining the plates at a spaced-apart relation and defining a wall-receiving gap G between an inside face 165 of the inside plate 164 and an inside face 167 of the external plate 166, said gap configured to accommodate a wall portion. In the illustrated example, the surface of the inside face 165 is flat and smooth and is configured for bearing over a wall portion as discussed in connection with previous examples. It is seen that the opening of the gap G, i.e. the open, second, end of the wall anchor 160 has a span P which is slightly larger than the thickness Q near the first end, facilitating easy insertion of the wall anchor into position over a wall portion. However, it is appreciated that Q can be equal to or greater than t. The portion of thickness Q can extend longer (i.e. a longer portion of external plate 166 extending parallel to the inside plate 164).

As mentioned, the cylindrical connecting member 140 has a round perimeter wall surface 172 and further that the inside plate member 164 and the external plate 166 are configured with a priori fastener-receiving bores 174$_i$ and 174$_e$, respectively. Said bores extend coaxially along axis Y, disposed substantially parallel to axis X of the connecting member 140. As noted, the fastener receiving bores 174$_i$ and 174$_e$ can be threaded or smooth, and can be of a diameter smaller than the nominal diameter of a threaded fastener configured for screw-engagement therewith. In the particular example, the diameter of the inside fastening bore 174$_i$ is slightly larger than the diameter of the outside fastening bore 174$_e$, and in this case the diameter of the outside fastening bore 174$_e$ is the nominal bore.

The wall anchor 160 can be mounted at any orientation, i.e. with the first end 138 extending upwards (as in the display of FIGS. 7A-7F) or at an inverted orientation, namely with the first end 138 extending down (as in the display of FIGS. 8A-8E), wherein the rounded perimeter portion 177 (FIG. 7F) bears over a respective round portion of the opening in the wall. It is however noted that at any mounting configuration the rounded portion of the cylindrical connecting member 140 comes to rest over a respective round portion of an opening 184 formed in the wall W (FIGS. 8A-8E) so as to be in surface contact and increase load bearing (i.e. at least an arc portion of the cylindrical connecting member 140 rests over a respective arc portion of the opening 184 in the wall W), wherein the rounded perimeter portion 179 (FIG. 7F) bears over a respective round portion of the opening in the wall.

With further reference now being made also to sequential FIGS. 8A to 8E, a step-by-step mounting sequence of wall anchor generally designated 160 on a wall portion generally designated W is illustrated.

Once location is determined an opening 184 is drilled in the wall W, the diameter being a nominal diameter conforming with the diameter d of the cylindrical connecting member 140 of the wall anchor 160, and the thickness of the wall portion at the drilling site is approximately similar to the thickness t.

Then, the wall anchor 160 is manipulated into the opening 184, if necessary by slightly elastically bending the wall anchor 160 to facilitate introducing the second end (the bent end) of external plate 166 into the opening 184 (in direction of arrows 190$_i$, 190$_{ii}$ and 190$_{iii}$—FIGS. 8A to 8C), and then slightly pushing the inside plate 164, at the location of the connecting member 140, against the wall surface W (as indicated by arrow 192 FIG. 8D), and then the wall anchor 160 is pushed downwards in direction of arrow 194 (FIG. 8E) so that the connecting member 140 fits within the round opening 184 such that at least portions of perimeter wall surface 179 (seen in FIG. 7F) of the connecting member 140 bear against at least a perimeter portion 185 of the round opening 184.

Once positioned in place, the wall anchor 160 is ready for applying a fastener thereto (not shown), wherein the threads of the fastener penetrate through three layers of material, namely receiving bore 174$_i$ of the inside plate 164, the wall portion W, and the receiving bore 174$_e$ of the external plate 166, thus configured for bearing shear force.

The invention claimed is:

1. A wall anchor comprising an external plate and an inside plate partially overlapping the external plate, each of the external plate and an inside plate having a wall-facing side, the plates being rigidly connected to one another adjacent a first end of their respective wall-facing sides by a cylindrical connecting member, at least a portion of the cylindrical connecting member is configured with a round perimeter, each of the external plate and the inside plate is configured adjacent a second end thereof with at least one coaxially extending fastener-receiving bore, the wall anchor being configured for inserting the external plate member into an opening formed in the wall and then positioned such that a wall portion extends between the inside faces of the external and inside plates, wherein at least the inside plate bears flush against an inside face of the wall portion, and wherein at least a round portion of the cylindrical connecting member bearing against at least a portion of the opening.

2. The wall anchor of claim 1, wherein one or both of the external plate and the inside plate are elastically deformable.

3. The wall anchor of claim 1, wherein the external plate extends parallel to the inside plate.

4. The wall anchor of claim 1, wherein the external plate is configured with at least one integrally formed auxiliary fastening plate.

5. The wall anchor of claim 4, wherein the at least one auxiliary fastening plate extends parallel to the external plate, with the auxiliary fastening plate extending from a second end of the external plate and facing the first end.

6. The wall anchor of claim 4, wherein the external plate is U-shaped.

7. The wall anchor of claim 1, wherein the inside plate comprises a concealing portion extending beyond boundaries of the cylindrical member.

8. The wall anchor of claim 1, configured for mounting with the second end facing at any angular orientation pivotally retained about the cylindrical member.

9. The wall anchor of claim 1, wherein the cylindrical member is configured with a thickness corresponding to a thickness of a wall onto which the wall anchor is to be mounted.

10. The wall anchor of claim 1, wherein distance of the inside plate and the external plate, at the first end thereof, is defined by the thickness of the cylindrical member, said thickness being measured along an axis extending normal to the wall-facing side of the inside plate.

11. The wall anchor of claim 1, wherein the circumcircle of the connecting member is configured with a diameter corresponding to the opening formed in the wall through which the external plate is introduced when installing the wall anchor on the wall.

12. The wall anchor of claim 1, wherein the distance between the wall-facing sides of the inside plate and of the external plate is equal to a nominal thickness of a wall configured to bear the wall anchor.

13. The wall anchor of claim 1, wherein the wall anchor is a clip-nut configured for mounting at an edge of a thin wall portion, wherein the cylindrical connecting member extends outside of said wall portion.

14. The wall anchor of claim 1, wherein at least a portion of the cylindrical connection member is configured for bearing against a circular portion of an opening formed in the wall.

15. The wall anchor of claim 1, wherein the external plate extends from a rear of the connecting member and is bent towards the inside plate so as to reduce the gap between the plates at least a second end portion thereof.

16. The wall anchor of claim 1, wherein the inside plate is flat and smooth for placing flush over a wall surface and an axis of the cylindrical connecting member extends normal from the wall facing side of the inside plate.

17. The wall anchor of claim 1, wherein the external plate of the wall anchor is concave.

18. A wall anchor configured for securing a fastener to a wall, the wall anchor comprising an inside plate and an outside plate at least partially overlapping one another and being attached to one another at a first end of the wall anchor by a cylindrical connecting member, the cylindrical connecting member retaining the inside plate and the outside plate at a spaced apart relation with a wall-receiving gap extending there between, wherein at a mounted position a wall portion is received in said wall-receiving gap and extending flush between an inside face of the inside plate and an inside face of the outside plate, and at least a portion of the connecting member bears against walls of an opening formed in the wall, and each of the outside plate and the inside plate is configured adjacent a second end thereof with at least one coaxially extending fastener-receiving bore, the wall anchor being configured for inserting the outside plate into an opening formed in the wall and then positioned such that a wall portion is received within the wall-receiving gap, wherein at least the inside plate bears flush against an inside face of the wall portion, and wherein at least a round portion of the cylindrical connecting member bearing against at least a portion of the opening.

* * * * *